June 9, 1925.
C. A. PARSONS ET AL
1,541,656
DYNAMO ELECTRIC MACHINE
Filed Nov. 15, 1923
2 Sheets-Sheet 1
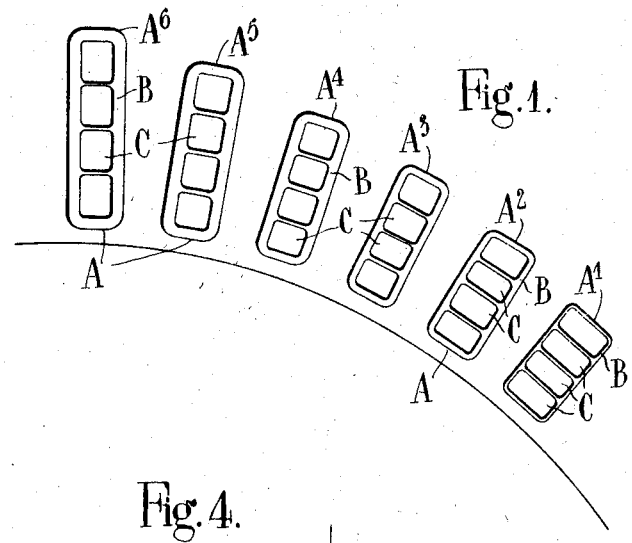
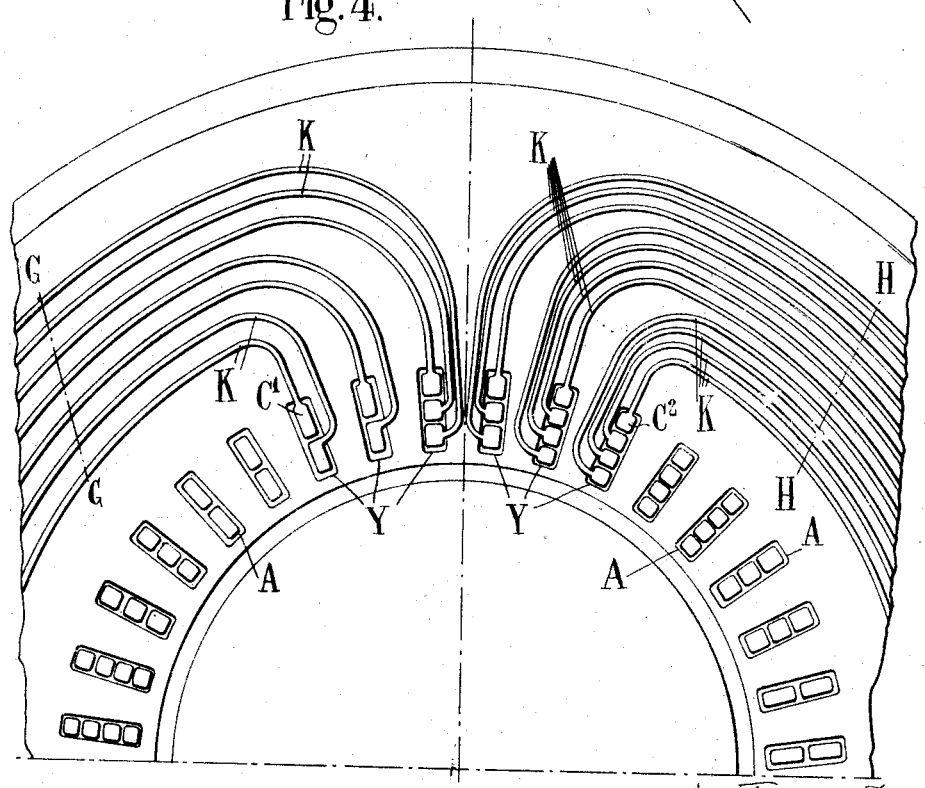
Inventors
Charles A. Parsons
Jessel Rosen
by Spear, Middleton, Donaldson & Hall
Attys Patented June 9, 1925.

1,541,656

UNITED STATES PATENT OFFICE.

CHARLES ALGERNON PARSONS AND JESSEL ROSEN, OF NEWCASTLE-ON-TYNE, ENGLAND; SAID ROSEN ASSIGNOR TO SAID PARSONS.

DYNAMO-ELECTRIC MACHINE.

Application filed November 15, 1923. Serial No. 674,866.

*To all whom it may concern:*

Be it known that we, CHARLES ALGERNON PARSONS and JESSEL ROSEN, both British subjects, and both residing at Heaton Works, Newcastle-on-Tyne, in the county of Northumberland, England, have invented certain new and useful Improvements in and Relating to Dynamo-Electric Machines, of which the following is a specification.

This invention relates to improvements in the design and construction of dynamo-electric machines and more particularly to high voltage alternating current motors and generators.

The object of the invention is the provision of a generator capable of generating higher voltages than has been common practice heretofore, with a view in certain circumstances to eliminate the need of transformers.

To this end the invention consists in the apparatus hereinafter described and particularly pointed out in the claims.

The invention also consists in the improved electrical apparatus and modifications thereof substantially as hereinafter described.

Referring to the accompanying drawings:—

Figure 1 is a cross-section showing a portion of the stator of an alternator having slots of different depths;

Figure 4 is a section on line X, X, of Figure 5, showing an end elevation of a portion of the end connectors and the stator slots of an alternator;

In carrying the invention into effect according to one modification as shown in Figure 1 of the drawings and as applied for example to an alternating current generator, the stator is provided with slots A in which the conductors C are placed. The dimensions of these slots A are varied so that the adjacent slots $A^1 \ldots A^6$ increase in depth as the potential of the conductors increases, the width of the slots remaining constant. Each slot is provided with four conductors, the area of the conductors being the same in all the slots. The cross-sectional area of the slots is thus graded in relation to the cross-sectional area of the conductors contained therein.

The four conductors C in the slot $A'$ are all of the same dimension but are of different dimensions from those in the slot $A^2$, $A^3$ and so on. The area of the conductors is kept constant but their dimensions are varied from slot to slot so as to fit into the different sized slots to the best advantage. This increase in the area of the slot allows for the accommodation of extra insulation B. Six slots have been taken as an example but any number can be employed.

Care is taken to minimize flux pulsations by so designing the slots as to keep the magnetic circuit as uniform as possible in every position of the rotor.

Figures 2, 3:
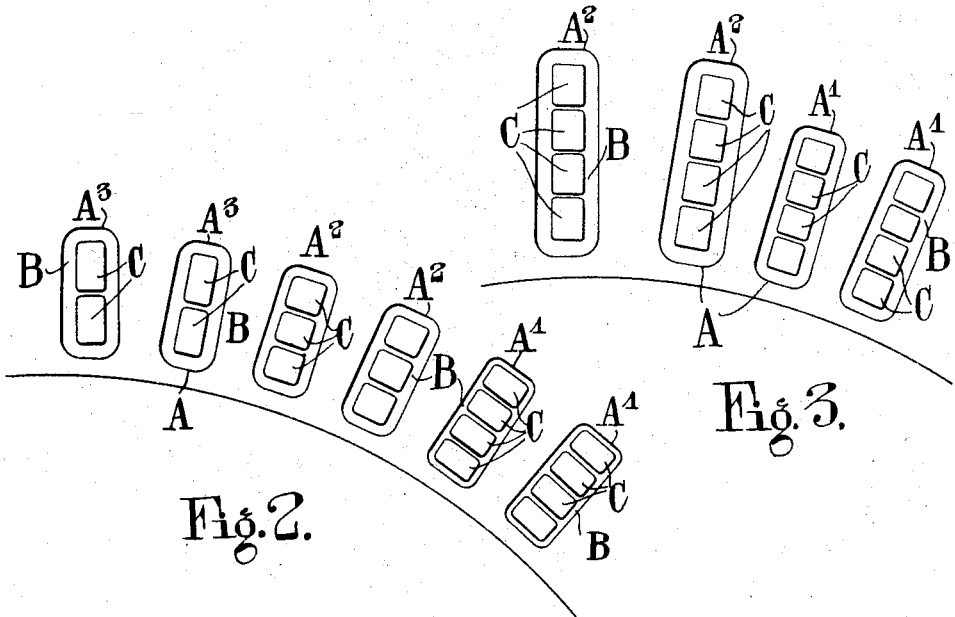
Figure 2 is similar to Figure 1 showing a different arrangement of slots.
Figure 3 is a cross-section through the stator of an alternator showing another arrangement of slots.

According to another modification of the invention shown in Figure 2 the conductor slots A are all of the same dimensions, and the number of the conductors C in the slots at the higher potentials is reduced and the space thus made available is utilized for extra insulation B. The slots $A^1$ have four conductors, $A^2$ three conductors and $A^3$ two conductors each.

This modification has the same advantage as in the case of the deeper slots in that the losses in the slots are lowered with the increase in cross-sectional area of the insulation owing to the smaller number of conductors, and therefore the heat transferred through the thicker insulation is reduced and the temperatures remain fairly uniform for all the slots.

In the slots shown in Figure 2, marked $A^1$, each conductor occupies 14 per cent of the area of the slot and the four conductors 56 per cent of the area of the slot. In the slots shown at $A^2$ one conductor occupies 17 per cent of the slot and the three conductors 51 per cent of the area of the slot. The slots marked $A^3$ each have two conductors, each conductor occupying 20 per cent of the area of the slot. It will thus be seen in this modification that the conductors occupy from between 40 to 56 per cent of the area of the slots.

According to the modification shown in Figure 3, the depth of the slots, the width of the slots and the space between the slots are all varied so that the insulation may be suitable for the high potentials of the conductors in the respective slots. The slots marked A¹ are the same size and have four conductors whilst the slots marked A² are larger in width and depth and are provided with four conductors which are larger than the four conductors in the slots A¹. Thus the insulation as well as the area of the conductors is increased for the highest potential. The two slots A² are spaced farther apart from one another than the two slots A¹ to accommodate for their extra width and may, for instance, be spaced every 8½ degrees and the slots A¹ every 7½ degrees. Any combination of the above three modifications may be used.

Figure 4 is an end elevation of the modification according to Figure 2 showing half the stator slots in the alternator and the end connections of one phase only, the slots marked Y being in the one phase. The conductor marked C¹ is adjacent to the phase terminal, whilst the conductor marked C² is adjacent to the earth terminal. These conductors wind round in the usual way into slots which may be diametrically opposite.

Figure 5:
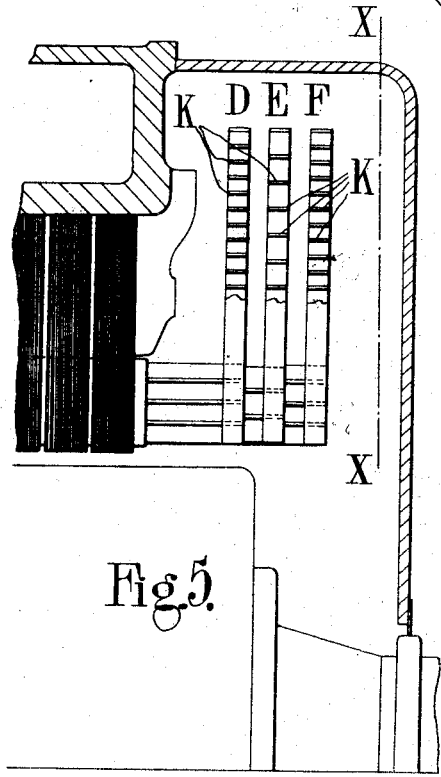
Figure 5 is a part longitudinal section of Figure 4.

The longitudinal section in Figure 5 shows the end connectors of the three phases coupled to their respective slot conductors, one phase being in each bank D, E and F respectively. The connectors K as shown in section at D and F it will be noticed are more numerous than those shown at E for the reason that D and F are taken on the section H—H of Figure 4, whereas the connectors E are taken on the section G—G of Figure 4. The greater spacing permits of more insulation being fitted to withstand the higher potentials.

Damping bars (not shown in the drawings) may also be fitted to the rotor to minimize the heating due to any flux pulsations that may be caused by unsymmetrical stator winding, or varying depth, width or spacing of slots. The insulation round the conductors in any slot is designed to withstand indefinitely the normal potential induced in the conductors in that slot from earth and therefore only the conductors in the slots adjacent to the phase terminals are insulated to withstand the full voltage indefinitely, as the latter are at a maximum potential from earth. However, it is generally advisable that the insulation of the whole of the windings should be such that it will stand the full machine voltage for extended periods, but where the star point of the winding is earthed this requirement is not essential.

It will be understood that not only will the thickness of the insulation be varied, but also the leakage surface from the conductors to earth, between conductors and between phases, will be varied in the same way.

It is desirable that the insulation be no thicker than is necessary to withstand the voltage across it so that a maximum of copper can be accommodated and the drop in temperature across the insulation reduced to a minimum. Where thick insulating material is used the cross-sectional area of the conductors may in some cases be increased in order to obtain the same temperature rises as those obtained with a smaller cross-sectional area of conductor with the thinner insulation.

Although the description given above relates to conductors in the body of the core, it will be readily understood that the same variations in cross-sections may be applied equally to the remainder of the windings.

It is conceivable that there are other methods than those stated above for obtaining the desired result and that in one machine two or more methods may be combined. The invention is applicable to direct current generators and motors and other dynamo-electrical apparatus and transformers as well as to alternating current machines as indicated above, and may be used to cheapen the construction of machines of more moderate voltage.

Having now described our invention what we claim as new and desire to secure by Letters Patent is:—

1. In combination in electrical apparatus, a member having therein a series of slots; electrically-associated conductors disposed in said slots and insulation also disposed in said slots and imbedding said conductors, the ratio of the cross-sectional area of said slots to the cross-sectional area of said conductors therein disposed varying progressively along said series, as set forth.

2. In combination in electrical apparatus, a member having therein a series of slots of equal size; electrically-associated conductors disposed in said slots and carrying currents of progressively increasing voltages, the number of conductors per slot descreasing as the voltage increases; together with insulation also disposed in said slots and imbedding said conductors, the thickness of said insulation being graded to correspond with said varying voltages, as set forth.

3. Electrical apparatus comprising a member having a series of slots of equal size, electrically-associated conductors disposed in said slots and carrying currents of different voltages; together with insulation also disposed in said slots and imbedding said conductors, the thickness of said insulation being graded to correspond with said different voltages, as set forth.

In testimony whereof we have signed our names to this specification.

CHARLES ALGERNON PARSONS.
JESSEL ROSEN.